United States Patent [19]

Skalsky

[11] Patent Number: 5,644,570
[45] Date of Patent: Jul. 1, 1997

[54] ARRANGEMENT FOR CONNECTING A COMPUTER TO A TELECOMMUNICATIONS NETWORK, AND A METHOD FOR BIT RATE ADAPTATION IN THIS ARRANGEMENT

[75] Inventor: Peter Skalsky, Zurich, Switzerland

[73] Assignee: Siemens Aktiengesellschaft, Munich, Germany

[21] Appl. No.: 420,216

[22] Filed: Apr. 11, 1995

Related U.S. Application Data

[62] Division of Ser. No. 955,712, filed as PCT/CH92/00089, May 7, 1992, Pat. No. 5,432,792.

[30] Foreign Application Priority Data

May 13, 1991 [CH] Switzerland ............ 01 418/91
Jul. 10, 1991 [CH] Switzerland ............ 02 047/91
Aug. 21, 1991 [CH] Switzerland ............ 02 453/91

[51] Int. Cl.[6] .................................................. H04J 3/22
[52] U.S. Cl. ........................ 370/468; 375/220; 375/225
[58] Field of Search ................................. 375/225, 344, 375/220, 257, 219; 370/84; 395/200.2, 250

[56] References Cited

U.S. PATENT DOCUMENTS 4,700,340 10/1987 Beranek et al. .
4,736,409 4/1988 Hasegawa et al. .................. 19/200
4,805,167 2/1989 Leslie et al. .
4,922,490 5/1990 Blakely .
4,991,169 2/1991 Davis et al. .
5,058,156 10/1991 Dietze .
5,251,313 10/1993 Spenik et al. ...................... 375/220

FOREIGN PATENT DOCUMENTS 0255306 2/1988 European Pat. Off. ....... D01G 15/36
0359156 3/1990 European Pat. Off. .

OTHER PUBLICATIONS

J. Burren, "Flexible Aggregation of Channel Bandwidth in Primary ISDN", *Computor Communication Review* 19 (1989) Sep., No. 4, New York.

"Application de L'access Primaire RNIS", *Electronique Industrielle*, Jun. 1988, pp. 26–28.

*Primary Examiner*—Wellington Chin
*Assistant Examiner*—Soon Dong Hyun
*Attorney, Agent, or Firm*—Greenblum & Bernstein, P.L.C.

[57] ABSTRACT

A method for performing a bit rate adaptation of a data channel that exchanges information between two units operating at different transmission rates. A data stream is divided into at least one data set that is specified by a word length of an arithmetic and logic unit, so that information can be extracted from the at least one data set. The extracted information is then transferred to, for example, a computer or a data network.

13 Claims, 9 Drawing Sheets

1

ARRANGEMENT FOR CONNECTING A COMPUTER TO A TELECOMMUNICATIONS NETWORK, AND A METHOD FOR BIT RATE ADAPTATION IN THIS ARRANGEMENT

This application is a division of application No. 07/955,712, filed Dec. 17, 1992, now U.S. Pat. No. 5,432,792, which is the National Phase of PCT/CH92/00089, filed Jun. 7, 1992.

BACKGROUND OF THE INVENTION

1. Field of the Invention

The present invention is directed to an arrangement for connecting a computer to a digital telecommunications network to exchange data between the computer and other data transmission and data receiving devices connected to the telecommunications network, to a method for bit rate adaptation of a data channel, over which control data and/or useful data in a data stream are exchanged between at least two units or data networks operating at different transmission rates, in particular between a telecommunications network and a computer, and to the use of the method in the arrangement.

2. Discussion of Background and Other Information

In principle, Integrated Services Digital Networks (ISDN) provides two different modes of subscriber access: basic access and primary rate access. The primary rate access can be subdivided into what are known as channel structures. A distinction is made between an H1, an H0, and a B channel structure and a mixed structure. In the mixed structure, a combination of B and H0 channels can be chosen. While the transmitted data of the various B, H0 and HI channels are of no significance for handling information over the telecommunications network (this is known as bit-transparent transmission), a signaling channel (D channel) is needed to make and break connections within the telecommunications network. When ISDN subscribers are connected to computer systems, the point of departure thus far has been basic access, or at best, primary rate access with an HI channel structure. The basic access mode, which allows a maximum transmission rate of 144 kbit/s, can be achieved with a relatively modest expenditure for circuitry per access unit. However, its disadvantage is the low number of subscriber connections per access unit, because basic access provides only two B channels and one D channel. If 30 simultaneous subscriber connections are needed, for example, then 15 access units must be made available. This high expenditure for circuitry on the one hand increases the costs and the effort and expense for service, and it also lowers the reliability of the overall system. Although primary rate access with an H1 channel structure does allow the planned transmission rate of 2 Mbit/s, it is usable only for communication between two ISDN subscribers; that is, the transmission in the telecommunications network is bit-transparent over the entire channel bandwidth of the primary rate access. For an interface component unit for processing a primary access with a B channel structure, which according to CCITT I-431 furnishes the user with 30 B channels (basic channels) and one D channel (auxiliary channel) at 64 kbit/s, and thus allows 30 different subscribers to have simultaneous access to one computer, an interface subassembly for processing a primary rate access with an H1 channel structure cannot be used.

SUMMARY OF THE INVENTION

It is accordingly an object of the present invention to disclose an arrangement for connecting a computer to a digital, public or private telecommunications network, such that a large number of subscriber terminals connected to the network can simultaneously access the same computer, and a method for bit rate adaptation that can be employed in the arrangement to enable the exchange of data between two units or networks operating at different transmission rates.

The present object is attained by providing an interface subassembly which is connected both to the computer and to a reference point, via at least one access that has one basic channel and one auxiliary channel, to a traffic handling system provided in the telecommunications network, and which comprises a channel allocation unit, a parallel arithmetic and logic unit, and a bus adaptation unit. The parallel arithmetic and logic unit is provided with a central computer and at least one arithmetic and logic unit and is capable of simultaneously processing all the channels of the connection. In the method for attaining the object of the invention, the data stream is divided into at least one data set or data unit, specified by the word length of an arithmetic and logic unit, and the useful information is extracted from the data set or data unit and transferred to a computer or data network.

Advantageous features of the invention are disclosed in the dependent claims.

The invention has several advantages: A large number of inexpensive terminals can be simultaneously connected to a central computer system, via the existing private or public telecommunications network. This is not only advantageous in relatively small subscriber switching systems in private networks—as in businesses—but also can be achieved without special effort or expense over a public telecommunications networks. Installing expensive, company-wide local area network (LAN) cabling is unnecessary; instead, existing private or public network lines can be used for communication between individual terminals and a computer. Moreover, a compact-structure interface subassembly is used, which not only considerably improves the reliability of the overall system but also lowers the cost. Because bit rate adaptation is achieved with software, the interface subassembly hardware can be reduced to general, flexible functions. New bit rate adaptation algorithms or other more-comprehensive algorithms can be developed for the existing hardware without requiring that the hardware itself be adapted. Finally, this interface subassembly makes it possible to simultaneously process all 30 B channels of a primary access.

BRIEF DESCRIPTION OF THE DRAWINGS

The invention will be described in further detail below in conjunction with the drawings.

FIGS. 8A–8C show one data set in various processing phases of the bit rate adaptation in progress in a second stage;

FIG. 9 shows a data word of a data unit with two search windows for synchronizing the data stream with the processing phases of an arithmetic and logic unit;

FIG. 10 shows the data stream before the first stage of bit rate adaptation during a plurality of processing cycles;

FIGS. 12A–12F show a data unit together with an extraction word, in various phases of the processing cycle during the data extraction.

DETAILED DESCRIPTION OF THE PREFERRED EMBODIMENTS

Figure 1:
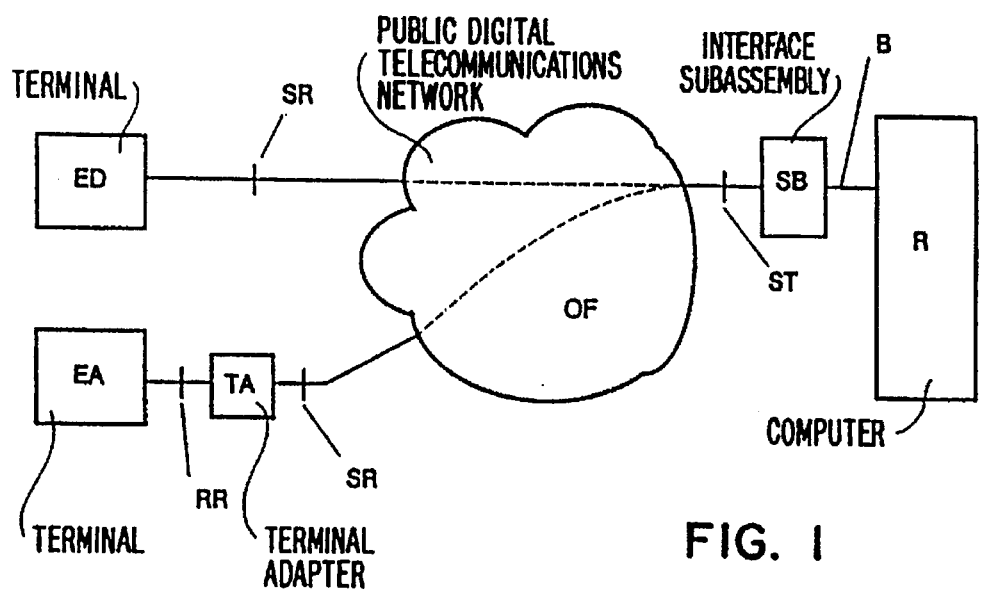
FIG. 1 shows the use of an arrangement according to the present invention for connecting a plurality of terminals to one computer over a public telecommunications network.

FIG. 1 shows the use of an interface subassembly SB together with a computer R in a public digital telecommunications network OF, by way of example. The mode of operation and the interfaces of the telecommunications network OF have been largely standardized internationally, and are known as an Integrated Services Digital Network, or ISDN for short. The interface subassembly SB is connected to the computer R, on one side directly via a primary rate access at an S/T reference point ST (also called S2) of the telecommunications network OF and on the other side via a bus system B. Subscribers of the telecommunications network OF, which either have a purely digital terminal ED or a terminal EA that comprises either digital and analog or purely analog parts, either terminal being connected to a terminal adaptor TA via an R reference point RR, can enter into communication with the telecommunications network OF via S reference points SR, preferably via basic accesses, and can also get into contact with the computer R via the S/T reference point ST and the interface subassembly SB. The corresponding connections within the telecommunications network OF are shown as dashed lines in the drawing.

If the computer R is to simultaneously communicate with a plurality of subscribers or terminals EA and ED, then a corresponding number of B channels must also be simultaneously available. As the number of B channels required increases, the economic advantages of primary rate access over the base accesses required for an equivalent transmission capacity become increasingly clear. Thanks to the interface subassembly SB, to which the primary rate access can be connected directly at the S/T reference point ST, 30 subscribers can simultaneously perform their communication functions, from any arbitrary location. In this way, the computer R can be used for data exchange between terminals ED and/or EA and the computer R, for example, in successive value-added network services (VANS): X.400 message handling, ODA/ODIF applications, electronic data interchange (EDI), public data banks, public gateways, or public information services (for example, when inquiring about the range of articles sold by department stores).

To participate in these services, it is adequate for the ISDN subscriber to have a simple terminal EA, that is coupled to a terminal adaptor TA comprising either digital and analog or purely analog parts, or a purely digital terminal ED with an integrated ISDN connection.

Figure 2:
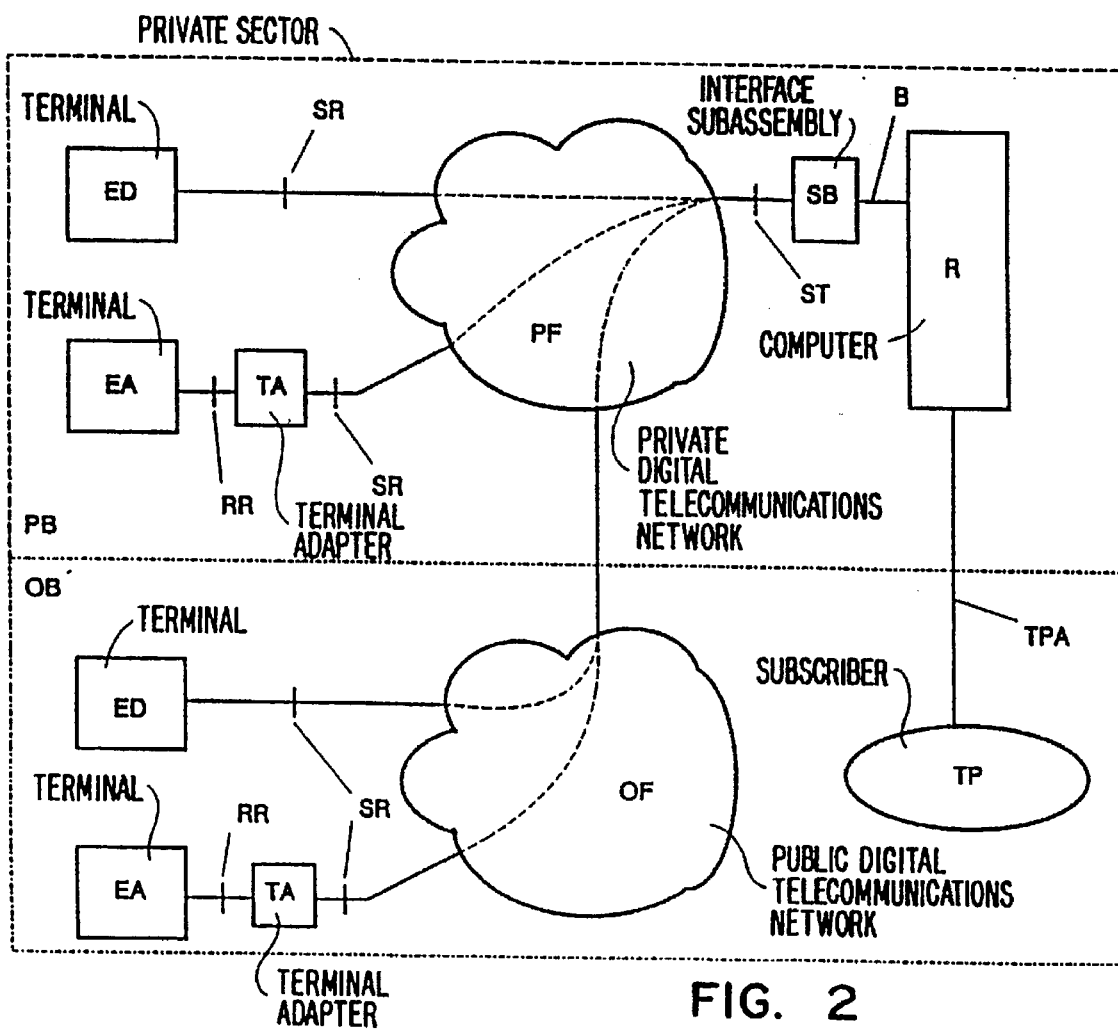
FIG. 2 shows the use of the arrangement according to the invention for connecting a plurality of terminals to one computer over one public and one private telecommunications network.

In FIG. 2, the computer R is connected via the interface subassembly SB to a private digital telecommunications network PF, which has at least one subscriber switching system. Subscriber switching systems are often used in businesses or in government offices, and as shown in FIG. 2, connections with digital and, analog public telecommunications networks OF are possible. The computer R, which is in the private sector PB and is equipped with the interface subassembly SB, is connected to the private telecommunications network PF at the S/T reference point ST via a primary rate access. Via terminal EA, equipped with terminal adaptor TA and comprising either digital and analog or purely analog parts, or via the purely digital terminal ED, subscribers of both the public and the private telecommunications network OF and PF have access to the computer R.

Accordingly, the application programs, installed in the computer R, of terminals ED and EA that are connected to the public or private telecommunications network OF or PF, are accessible over the standard telephone lines. Such services within the private sector PB include, for example, private electronic mail, private data banks, private gateways (such as, for example, to a subscriber TP via a Telepac access TPA), as shown in FIG. 2 central servers (for programs, backups, etc), and stockkeeping (recording mutations, inquiries, etc).

Figure 3:
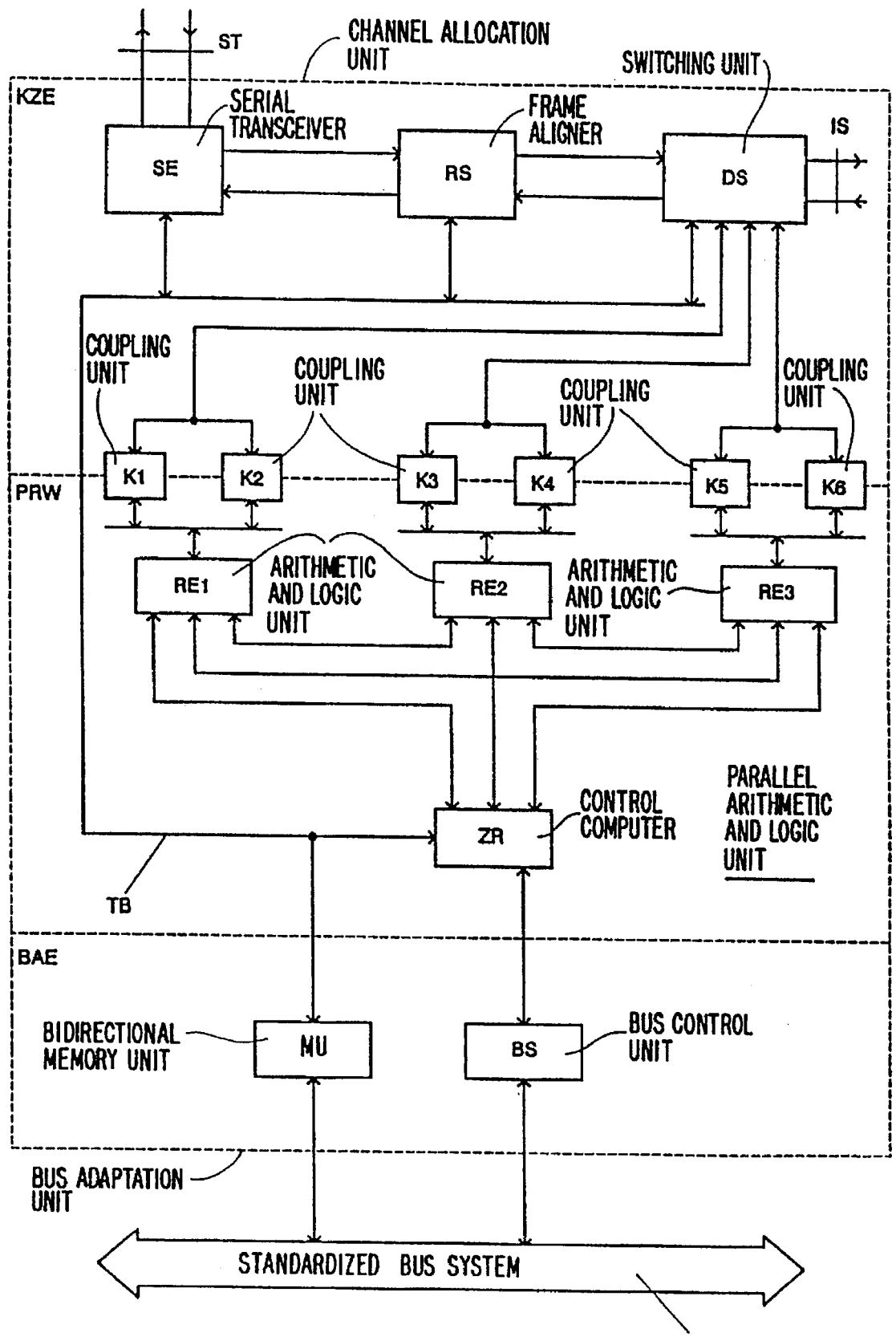
FIG. 3 shows the basic structure and one possible embodiment of the interface component of an interface subassembly used with the present invention.

FIG. 3 shows a possible embodiment of the interface subassembly SB. The basic structure comprises a channel allocation unit KZE, a parallel arithmetic and logic unit PRW, and a bus adaptation unit BAE. The channel allocation unit KZE, which is connected to the telecommunications network OF or PF via the S/T reference point ST, is made up of electronic components which perform specific telecommunications functions. To that end, a serial transceiver SE is provided, which is connected on one side to the S/T reference point ST and on the other to a frame aligner RS. The frame aligner is in turn connected to a switching unit DS, which can be connected to various coupling units K1–K6, and if necessary, via an internal interface IS, to other switching units, not shown in FIG. 3, with corresponding coupling units. The transceiver SE, the frame aligner RS and the switching unit DS are connected to a central computer ZR via a bus TB. When the direction of data transmission is from the telecommunications network OF or PF to the computer R (FIG. 1), the transceiver SE receives the data stream serially transmitted via the S/T reference point ST and sends it to the frame aligner RS. The transmission of data in the opposite direction proceeds simultaneously with the data reception. Besides the transmission functions, which are for instance implemented in accordance with given CCITT recommendations G.703, G.823, I.431, G. 732 and G.735–G.739, error recognition is also performed in the transceiver SE. This means that in the event of failure of the telecommunications network OF or PF, for example, or of the interface subassembly SB, an alarm is sent to the central computer ZR over the bus TB. Moreover, the cycle used for data transmission in the telecommunications network OF or PF is extracted from the received serial data stream and used for synchronizing the interface subassembly SB with the telecommunications network OF or PF. The cycle obtained is preferably allocated to the components of the interface subassembly SB that must be operated in synchronism with the telecommunications network OF or PF. The frame aligner RS recognizes the frame boundaries, namely the beginning and end of a frame, which are encoded, for example, in accordance with CCITT recommendation G.732. In addition, the frame aligner RS can be monitored and initialized by the central computer ZR. Once again, defective function courses are reported to the computer ZR. The alignment signals produced in the frame aligner RS are carried on to the switching unit DS together with the bit-transparent data for that stage. The switching unit DS, whose switching paths can be specified in fixed form, but arbitrarily, by a program in the central computer ZR via the bus TB during the initialization phase, transmits data of various 64 kbit/s channels (D and B channels) to the coupling units K1–K6. Simultaneously with each data stream per B channel, a byte synchronizing signal is transmitted to the corresponding coupling units K1–K6, so that each beginning of a byte is defined within the B channel data stream. In the embodiment of FIG. 3, two 64 kbit/s channels can be processed per coupling unit K1–K6, for a total of twelve 64 kbit/s channels. In the processing of all 30 B channels and of the D channel of a primary rate access, this means that there are additional connection capabilities for further coupling units. To that end, and as noted, other switching units DS can be connected in cascade to the internal interface IS, and additional coupling units can also be connected to those switching units, depending on the number of 64 kbit/s channels required.

The coupling units K1–K6 form the actual interface between the channel allocation unit KZE and the parallel arithmetic and logic unit PRW of the interface subassembly SB. While the telecommunications functions are carried out in the channel allocation unit KZE, as noted, arriving data of the individual channels are processed in the parallel arithmetic and logic unit PRW. To that end, one central computer ZR and a plurality of arithmetic and logic units RE1–RE3 are provided. Each arithmetic and logic unit RE1–RE3 is equipped with a local memory and with decoders required for decoding addresses, and is connected with preferably two couplings units K1, K2; K3, K4; and K5, K6, respectively. Together with the corresponding coupling units K1, K2; K3, K4; and K5, K6, respectively, and arithmetic and logic unit RE1, RE2 and RE3, respectively, form one data processing block. Furthermore, the arithmetic and logic units RE1–RE3 are interconnected with one another, and each individual unit RE1–RE3 is connected to the central computer ZR. The central computer ZR services the aforementioned bus TB, over which information can be exchanged between the channel allocation unit KZE and the bus adaptation unit BAE. By linking all the arithmetic and logic units RE1–RE3 among each another and the central computer ZR by special connections, a computing performance is achieved that is adequate to process at least twelve 64 kbit/s channels. Four of these channels at a time are processed in a data processing block, and in this exemplary embodiment, two channels are processed per coupling unit K1–K6. The data of the four channels provided per arithmetic and logic unit RE1–RE3 are handed over to the central computer ZR. If terminals ED and/or EA are V.24/V.28 terminals, the coupling units K1–K6 operate in the bit-transparent mode, and the arithmetic and logic units RE1–RE3 carry out a bit-rate adaptation, preferably in accordance with CCITT standards I.460 and I.463 (V.110), as described in conjunction with the method explained in FIGS. 5–12. Terminals ED and/or EA that operate by a HDLC-LAP-B (high level data link control—link access procedure—balanced) standard, a SDLC (synchronous data link control) standard, or similar standards may also be used. This means that the interface subassembly SB must also operate by these standards. Fast adaptation to one of these standards is possible by loading a new version of software from the computer R into the arithmetic and logic units RE1–RE3, via the central computer ZR. In this exemplary embodiment, a switchover can be made between the HDLC-LAP-B standard and the bit-transparent mode; the HDLC-LAP-B standard is especially suitable, because the coupling units K1–K6 support it by hardware.

Based on these standards, the following protocols can be used, in particular: X.25, T.90, T.70, V.120, etc.

The adaptation to a standardized bus system B, such as Multibus I, is done in the bus adaptation unit BAE of the interface subassembly SB. The modular design of the circuit arrangement makes it possible to employ the present concept for other bus systems as well. To that end, it suffices to adapt the bus adaptation unit BAE of the interface subassembly SB to a corresponding computer/bus system. In particularly, instead of the aforementioned Multibus I, either a nonstandardized or a standardized bus system, such as the Multibus II, a VME bus, a Future bus, an EISA bus, or a PC-AT bus, can be used. For adaptation to the selected bus system B, a bidirectional memory unit SE is provided on the interface subassembly SB; it is connected on one side to the central computer ZR, via the bus TB, and to the bus system B on the other side. The memory unit SM serves not only to transfer state information, but also to buffer-store arriving and outgoing data. A bus control unit BS is also present, which on the interface subassembly SB is connected directly to the central computer ZR and which also accesses the bus system B on the side of the computer R. Besides the usual bus functions, such as arbitration and controlling reading and writing cycles, the bus control unit BS also enables specialized initialization control, by means of which the interface subassembly SB can be initialized. Program elements are preferably loaded from the computer R in the initialization phase, so that no ROMs (read-only memories) need to be furnished in the interface subassembly SB for read-only storage of the initializing program.

The universal arrangement of the circuit of FIG. 3 not only allows the arbitrary allocation of the B channels but also makes it possible for the handling of the D channel to be given over to an arbitrary arithmetic and logic unit RE1, RE2 or RE3. One possible configuration would, for instance, be that the arithmetic and logic unit RE1 together with the coupling unit K1 would be programmed for processing the D channel, while the remaining arithmetic and logic units RE2 and RE3 that are shown would process eight B channels.

As already suggested briefly, other switching units DS can be connected to the internal interface IS to process more than twelve B channels, in order to increase the channel capacity. For example, if all 30 B channels and also the corresponding D channel of a primary rate access are to be simultaneously processed, then two other circuits in addition to the one shown in FIG. 3 must be added, but without transceivers SE and without frame aligners RS. In this way, the interface subassembly SB, which can thus be expanded in stages to a maximum of twelve 64 kbit/s channels in modules, can be adapted purposefully to the number of users that are to have access to the computer R. It would also be conceivable, however, for all the channels of a primary rate access to be embodied in one module, in which more than three arithmetic and logic units with corresponding coupling units are located in the same module, for instance, or for some other channel allocation to the various coupling units to be selected.

As already mentioned, sequence programs located in local memories of the arithmetic and logic units RE1–RE3 and of the central computer ZR for controlling the sequence of the data stream in the interface subassembly SB. These sequence programs are also modular in design and can be loaded into the interface subassembly SB from the computer R or, via the telecommunications network OF or PF, from a terminal ED or EA. This makes it easy to service, update and adapt existing firmware and perform diagnosis of the interface subassembly SB.

For the arithmetic and logic units RE1–RE3 and for the central computer ZR, transputers are especially suitable, because they are easily coupled to one another via so-called links. A version made with digital signal processors, or other processors of no lesser computing performance, is also possible.

For the frame aligner RS and the switching unit DE, an advanced CMOS frame aligner component (PEB 2035) or memory time switch component (MTSC), both made by Siemens, can for example, be used.

Figure 4:
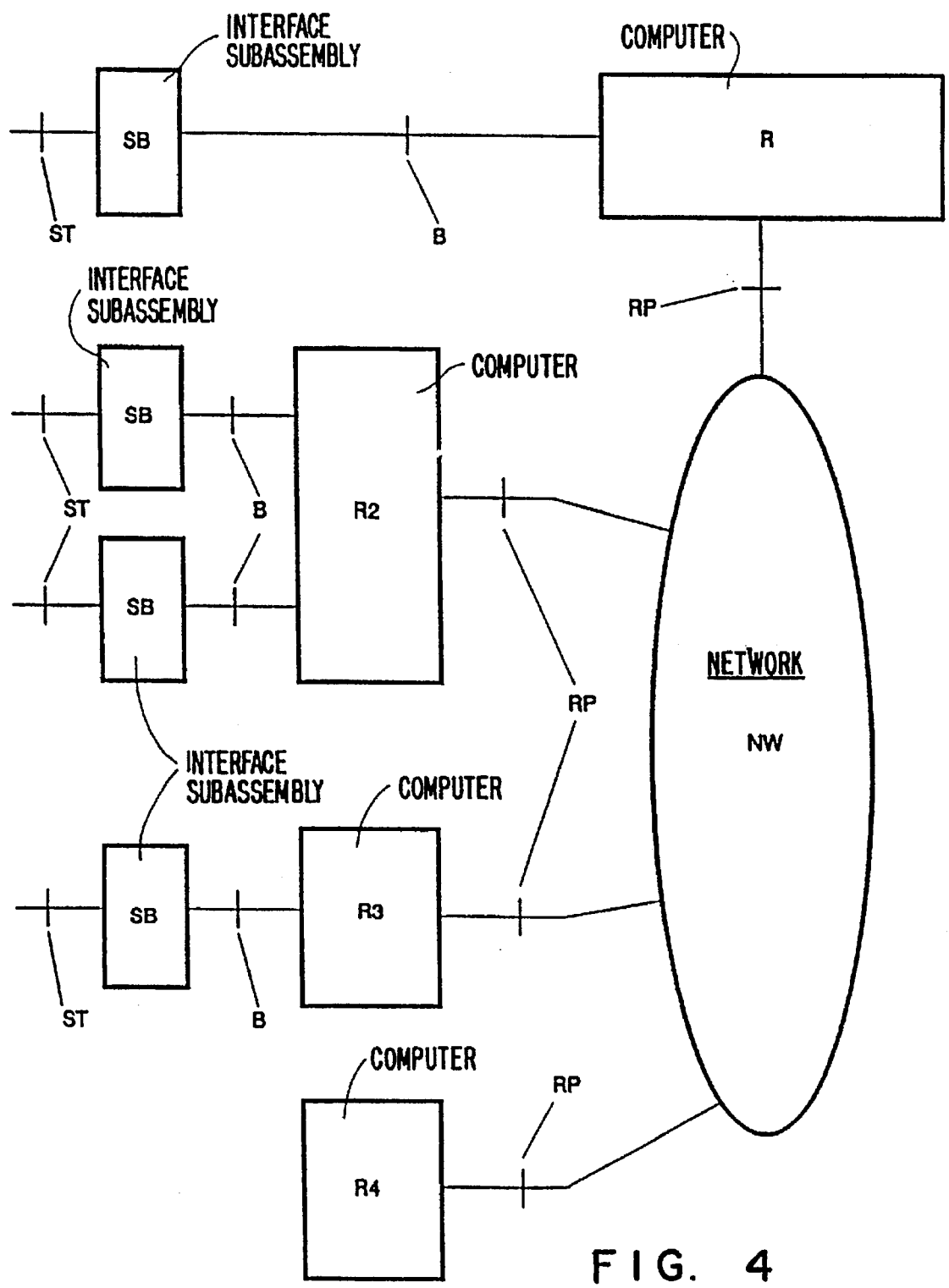
FIG. 4 shows the use of a plurality of interface subassemblies in a computer network system.

FIG. 4 shows one possible further expansion of the arrangement shown in FIGS. 1 and 2 for connecting a computer R to a telecommunications network OF or PF. In FIG. 4, the entire system is expanded along the lines of a computer network. A first variant, not shown in FIG. 4 but already mentioned (LAN application) relates to an expansion based on the version shown in FIGS. 1 and 2: A plurality of computers R are connected to the telecommunications network OF or PF, and the computers R can also communicate directly with one another via the network OF or PF. In the second variant, shown in FIG. 4, various computers R, R2 and R3 are connected via the bus system B to the interface subassemblies SB, which in turn are coupled to the telecommunications network OF or PF via the S/T reference points ST. Another possibility for connecting the computers R, R2 and R3 is obtained with access to a network NW, for instance, an Ethernet form, via reference points RP. This linking enables virtually unlimited expandability and performance: A large number of terminals can communicate simultaneously with different computer systems. In the embodiment of FIG. 4, computer R3, which does not store data in memory but instead passes data directly onto a host computer, such as the computer R, can also be incorporated in the network NW. Computer R3 does not have to be a high performance device; performance; in other words, an economical version can be achieved by using for example a personal computer.

Finally, FIG. 4 shows a computer R4 connected to the network NW, suggesting that the interface subassembly SB is suitable not only for the VAN applications described and for the computer network systems, but also for LAN/LAN couplings via ISDN. Individual subscribers at remote locations can form a LAN and be connected to other ISDN subscribers over ISDN telecommunications networks OF or PF.

To transmit extensive data blocks between two LANs coupled to ISDN telecommunications networks OF and/or PF, a greater transmission bandwidth than that available with a single B channel is desirable, because for data blocks of the same size, the transmission time decreases as the transmission bandwidth increases. The greater transmission bandwidth can be attained by interconnecting a plurality of B channels into one broad-band channel. However, care must be exercised when interconnecting various B channels between two points of a telecommunications network OF and/or PF, in order to assure that the various B channels do not normally take the same connection path within the telecommunications networks OF and/or PF, making it possible for the data of the data block, which are distributed among the various B channels, to be delayed to different extents. The data of a data block transmitted over the various B channels must therefore be corrected in terms of the delay times in one of the LANs involved. The method is made simpler in that the delay times existing between the B channels need to be defined only once, namely after the connection is made. This simplification is due to the fact that, for the entire connecting time, the B channels, once allocated, do hot change connection paths in the telecommunications network OF and/or PF.

The interface subassembly SB is designed for the available computing capacity in such a way that the aforementioned delays between the interconnected B channels can be defined for one broad-band channel. Thus, the broad-band channel can be put together from an arbitrary combination of an arbitrary number of B channels.

In the ensuing description of FIGS. 5–12, a method for bit rate adaptation will be described. The task of bit rate adaptation is the actual adaptation of the speed of the net bit rate of the terminals EA and ED (FIGS. 1 and 2) to the bit rate of the telecommunications network OF or PF by adding additional filler information. The bit rate adaptation should be done simultaneously in the opposite direction. This is achieved with a bit rate adaptation algorithm, that in the present exemplary embodiment is based on the specifications in CCITT recommendations I.460 and I.463 (V.110). Implementing the algorithm by software is especially favorable because of its ease of maintenance and because new demands of the algorithm can be achieved faster as a result. The method can also be used, for example, in the interface subassembly SB (FIGS. 1–4), or in their arithmetic and logic units RE1–RE3 (FIG. 3).

Figure 5:
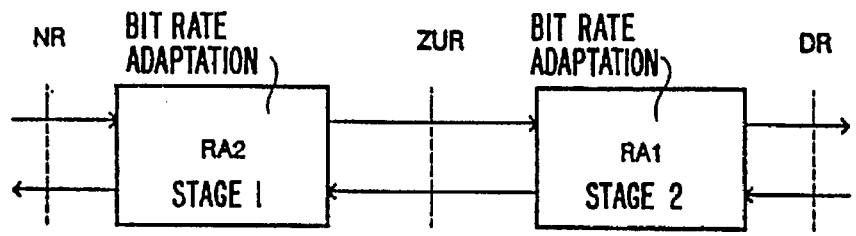
FIG. 5 shows one possible subdivision of a method for bit rate adaptation, employed in the arrangement, into two stages.

FIG. 5 shows one possible embodiment of the method according to the bit rate adaptation invention, with two bit rate adaptation stages RA1 and RA2. The first bit rate adaptation stage RA1 adapts a data rate DR, arriving on the site of the terminals ED and/or EA (FIGS. 1 and 2), to an intermediate transmission rate ZUR, which is adapted by a second bit rate adaptation stage RA2 to a network rate NR corresponding to the telecommunications network OF or PF. A bit rate adaptation in the opposite direction takes place simultaneously, namely from the network rate NR via the second bit rate adaptation stage RA2 to the intermediate transmission stage ZUR, and finally, via the first bit rate adaptation stage RA1, to the data rate DR. In the present embodiment, a terminal EA or ED (FIGS. 1 and 2) equipped with a V.24/V.28 interface on the B channel based on the ISDN standard, is connected with the following parameters: One stop bit, seven data bits, transmission rate of 9.6 kbit/s, asynchronous mode, and XON/XOFF sequence control. If the CCITT recommendations are followed in order to achieve this bit rate adaptation, then the speed adaptation in the two bit rate adaptation stages RA1 and RA2 is preferably done in accordance with CCITT recommendation I.460 and I.463 (V.110). This means that the data rate DR is 9.6 kbit/s, the network rate NR is 64 kbit/s, and the intermediate transmission rate ZUR is 16 kbits/s.

In FIGS. 6 through 12, the entire bit rate adaptation is illustrated in terms of the transition from the network rate NR of the telecommunications network OF or PF to the data rate DR of the terminals EA or ED, via the two bit rate adaptation stages RA2 and RA1.

Figure 6:
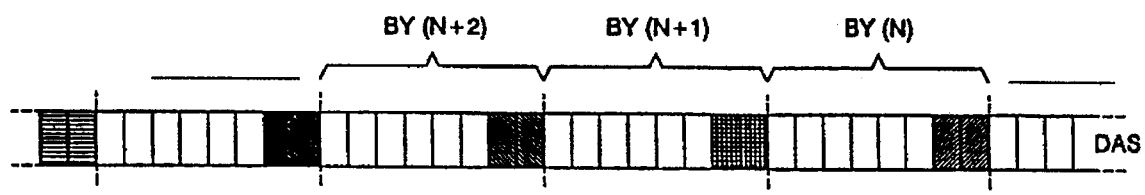
FIG. 6 shows a data stream, specified per subscriber channel, which is processed by the method of the present invention.

FIG. 6 shows a data stream DAS, of theoretically unlimited length, of a B channel, in the form in which it is allocated by the switching unit DS (FIG. 3) to the coupling units K1 through K6. The relevant data are limited to two bits per byte BY and are especially characterized in the data stream DAS of FIG. 6 by different shadings and by the consecutive numbering of the first byte. The arithmetic and logic units RE1 through RE3 (FIG. 3) take the data byte by byte in the order given from the corresponding data stream DAS via the coupling units K1 through K6 (FIG. 3) and place them in memory locations BY0 through BY15 or BY16 through BY31, in the same order, in the local memory of the arithmetic and logic units RE1 through RE3 (FIG. 3). That is, byte BY(N) of the data stream DAS is allocated to memory location BY0, byte BY(N+i) is allocated to memory location BY1, and so forth.

Figure 7A:
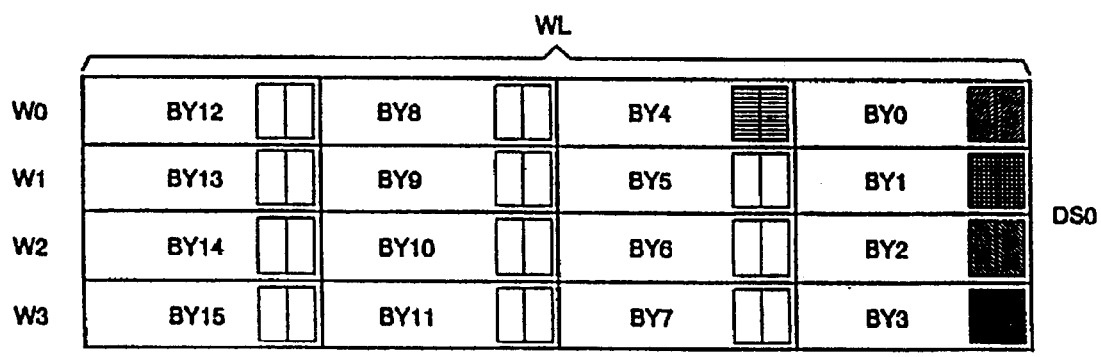
FIGS. 7A and 7B show two sets of data, in which the data stream is stored continuously and in alternation.
Figure 7B:
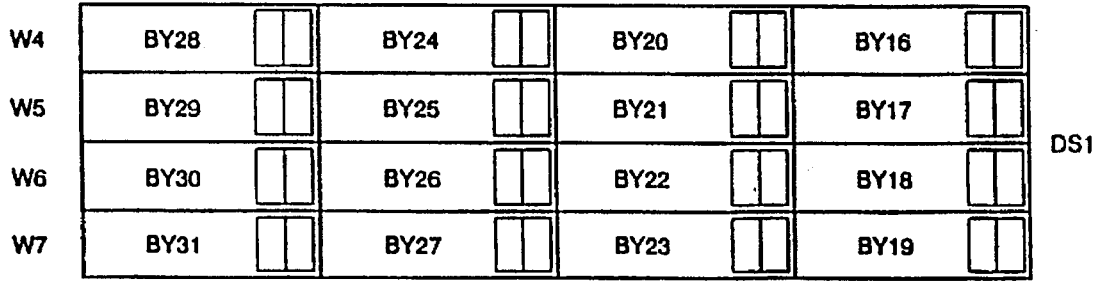

In FIGS. 7A and 7B, two data sets DS0 and DS1 are shown in the local memories of the arithmetic and logic units RE1 through RE3 (FIG. 3). Each data set DS0 and DS1 comprises four words W0 through W3 and W4 through W7, respectively, and each word W0 through W7 comprises 4 bytes. The result is a word length WL of 32 bits. The arriving data are extracted byte by byte from the data stream DAS (FIG. 6) and consecutively stored in the data sets DS0 or DS1. Once one of the data sets DS0 or DS1 is fully written with new data, the data deposit is continued in the other data set DS1 or DS0. In whichever phase a data set DS0 or DS1 is not written, the processing of the data of this data set DS0 or DS1 proceeds. In this way, one data set DS0 or DS1 is always being processed while the other is being written with new data. The prerequisite is that one data set DS0 or DS1 can be processed before the second is refilled. This is done for instance, by the parallel arithmetic and logic unit PRW, described in conjunction with FIG. 3, and having an appropritate performance capacity. The order in which the individual bytes BY (FIG. 6) are stored within a data set DS0 or DS1 corresponds to the numbering of the bytes BY0 through BY15 and BY16 through BY31. That is, bytes BY (FIG. 6) are stored in the data sets DS0 and DS1 from top to bottom in a column and from right to left from one column to the next. For greater clarity, the specially shaded relevant bits in FIG. 6 have also been shaded in FIG. 7.

Figures 8A, 8B, 8C, 9:
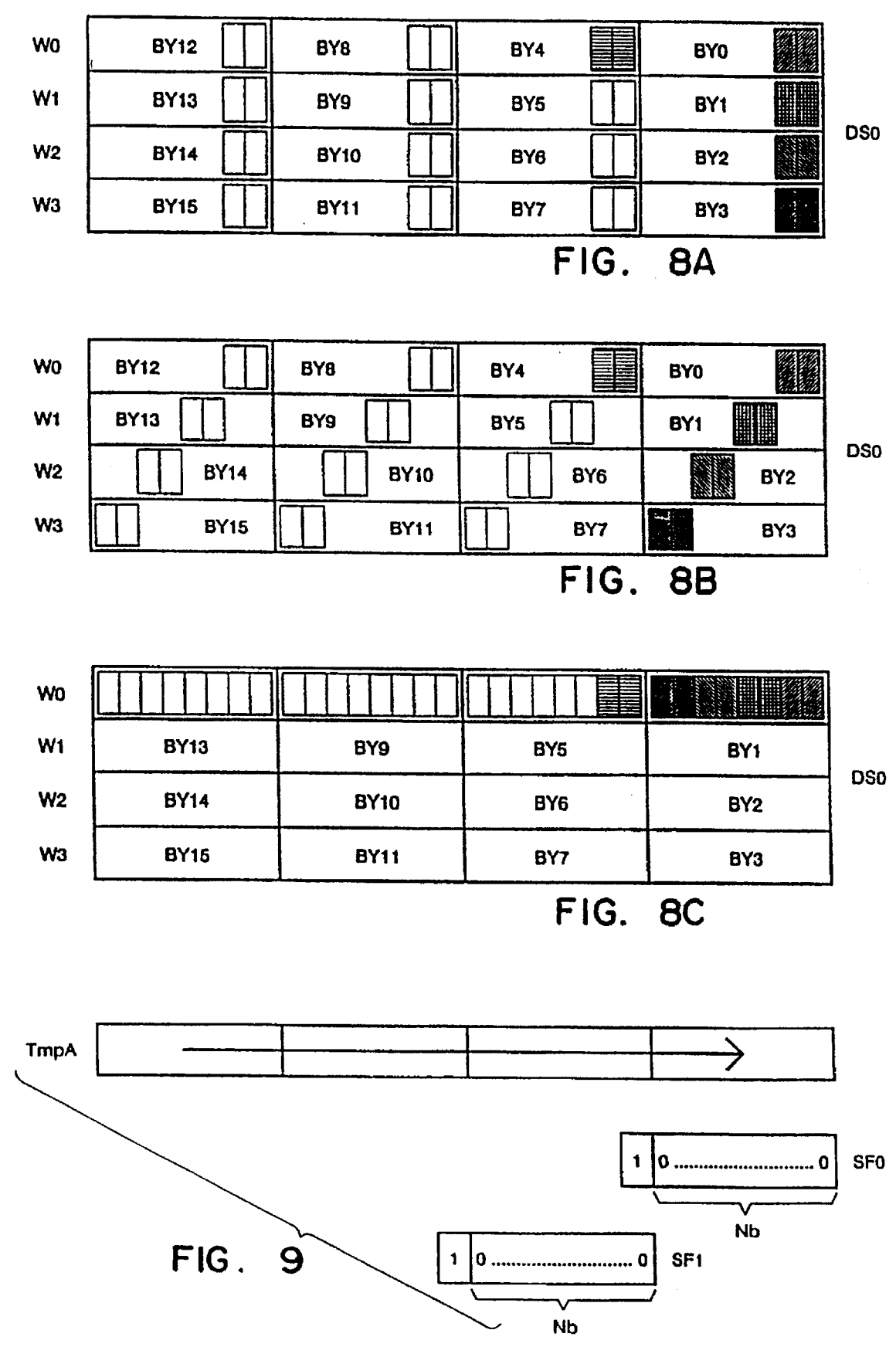

FIGS. 8A–8C show three further processing steps, as they are performed in the second bit rate adaptation stage RA2, of the data set DS0 that is completely filled with new data. In a first step, the contents of words W1 through W3 are shifted to the left as follows: The word W1 is shifted by two bit positions. The word W2 is shifted by four bit positions, and word W3 is shifted by six bit positions, in each case to the left. Word W0 remains unchanged. FIG. 8B shows the stairstep arrangement of the relevant data in the data set DS0 that results from the shift out of the outset position in FIG. 8A. It is important that the relevant data does not overlap in the vertical direction, which is the prerequisite for the second step: In this step, all the relevant data of the four words W0 through W3 are combined into word W0 (FIG. 8C). Upon changing word W0 to a data word TmpA—which is actually the third step—the adaptation in the second bit rate adaptation stage RA2 is concluded and new data can be stored in the data set DS0. The processing of the data set DS1 follows in the same way, and during this processing new data are again stored in the data set DS0. After these method steps, the transmission rate has been reduced by the factor of 4: The net rate NR has been lowered from 64 kbit/s to the intermediate transmission rate CUR of 16 kbit/s.

In this embodiment, a word length WL of 32 bits is assumed. If, as in this case, four words W0 through W3 for a data set DS0 or DS1 are selected, then, with the described method, precisely one word W0 with relevant, coherent data is obtained. However, a different word length, such as 16 or 64 bits, is also conceivable. If it is desirable for the relevant data to be stored coherently in one word, as in the present embodiment, then the general rule is that the number of words per data set DS0 or DS1 must be equal to the number of bytes in one word.

To synchronize the data stream DAS (in FIG. 6) with the processing steps of the first bit rate adaptation RA1, a particular synchronization bit pattern Nb (see FIG. 9) must be looked for in the data stream DAS. With the present V.24 implementation, this is a 0 byte, which is transmitted at the beginning and also during the data transfer at regular intervals. For synchronization, this 0 byte must assume a specified position within the data word TmpA. In the present embodiment, the synchronization is achieved once the least significant bit of synchronization bit pattern Nb matches the least significant bit of the data word TmpA in position, or in other words, once the synchronization bit pattern Nb comes to rest in the flush right position in the data word TmpA. FIG. 9 shows the steps necessary for the synchronization: The part of the data stream DAS (FIG. 6) that is located in the data word TmpA and has been reduced in the second bit rate adaptation stage RA2 is compared, preferably with two stationary search windows SF0 and SF1, each provided with the particular bit pattern being looked for, given a word length WL of 32 bits and a synchronization bit pattern length of 9 bits. If the comparison with the two search windows SF0 and SF1 comes up negative, then the data word TmpA is shifted to the right by one position. Next, another comparison is done of the data present in the data word TmpA with the data located in the two stationary search windows SF0 and SF1. If the contents of the search window SF0 match the contents of the data word TmpA at the instantaneous position of the data word TmpA, then the beginning of the relevant data stream has been recognized and the synchronization bit pattern Nb is flush right in the data word TmpA. If the contents of the search window SF1 match the contents of the data word TmpA in this position, then, in the present embodiment, the data word TmpA must be shifted to the right by an additional 8 bit positions to meet the requirement that the synchronization bit pattern Nb be flush right in the data word TmpA. In addition to these method steps that are requird for synchronization purposes, steps for automatically removing nonrelevant signals, such as idle signals, brake signals, etc., from the data stream are also provided. The data remaining after the synchronization contain not only the useful data, but also various control data and additional transmission data, as provided in the CCITT standards.

Instead of the two search windows SF0 and SF1, it is also possible for only one search window SF0 to be used. However, a longer search time must then be expected, since on average, more comparisons must be made than if there are a plurality of locally shifted search windows SF0 and SF1. On the other hand, it is also possible to use too many locally shifted search windows for the synchronization. If too high a number of search windows is selected, the efficiency of searching drops, because on the one hand, the number of comparisons rises, and on the other hand more memory is required for the search windows.

Figure 10:
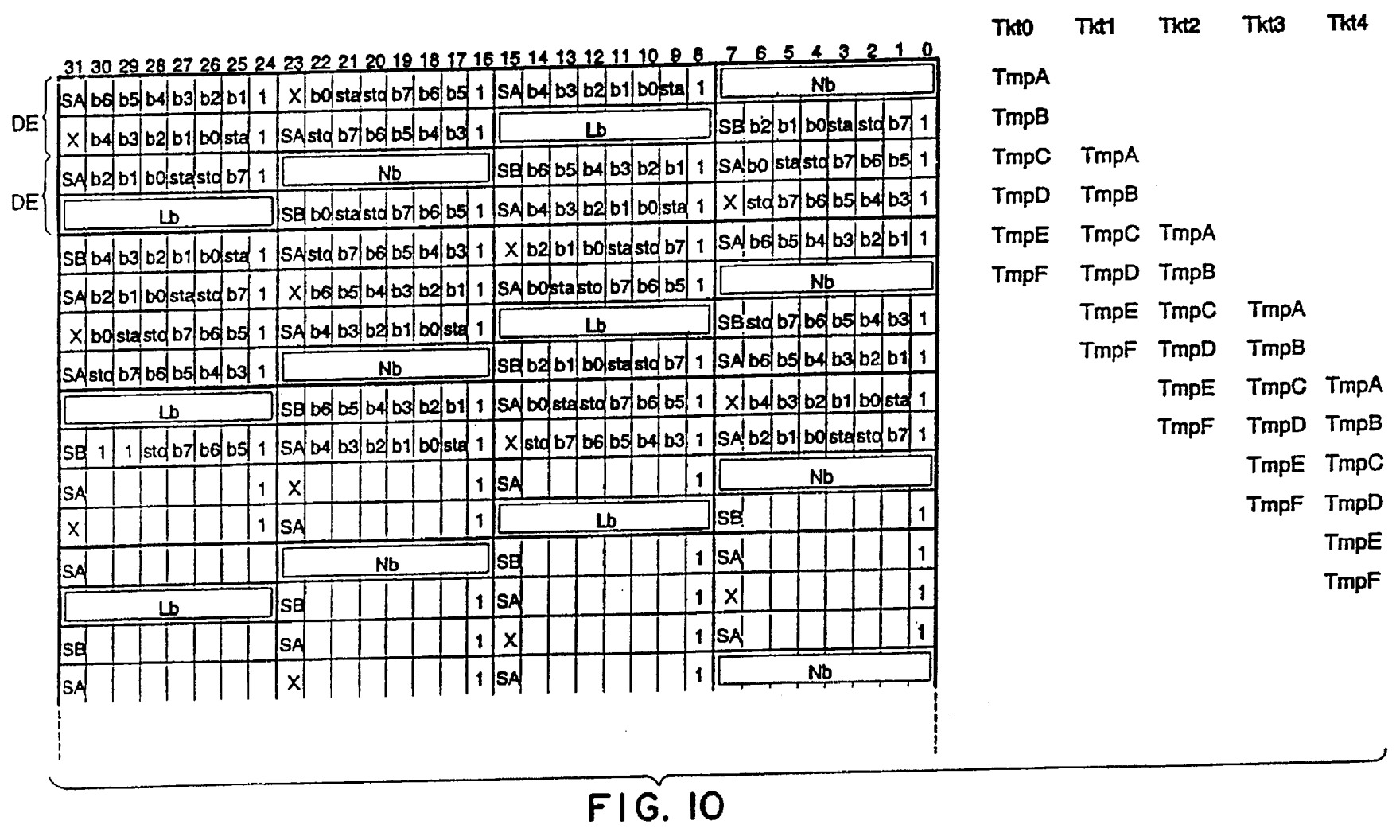

FIG. 10 shows the data stream DAS, synchronized and placed in data units DE, before the first bit rate adaptation stage RA1 and a plurality of processing cycles Tkt0–Tkt4, used in the processing in the first bit rate adaptation stage RA1. A data unit DE is composed of two data words TmpA and TmpB, for instance, and is processed completely in one processing cycle Tkt0. After the processing of one data unit DE, the data words TmpC and TmpD are to the new data words TmpA and TmpB. The remaining data words are named incrementally in the same way, progressing through the alphabet. This renaming and shifting along the alphabet can be seen in FIG. 10 for each of the processing cycles Tkt0–Tkt4 listed. Data originating in the second bit rate adaptation stage RA2 in the table shown in FIG. 10 are placed from right to left with the word length WL of 32 bits specified by the arithmetic and logic units RE1–RE3. In the table, the various bits are named for their function. In the cycle Tkt0, the following information is present in the data word TmpA: The synchronization bit pattern NB is a 0 byte, in which all the bits are set to 0. Next follows a 1, which can likewise be seen in the search window SF0 or SF1 (FIG. 9). A start bit "sta" indicates the actual beginning of useful data b0–b7; by the V.24/V.28 protocol, these useful data are interrupted by other control data, such as SA, SB, X or a "1". Following the last useful data bit b0–b7, one stop bit "sto" each is transmitted. An idle byte LB, in which other control data may be encoded, represents a special information unit. It may, for instance, involve the encoding of the transmission speed or other information provided in the V.24/V.28 standard. The sequences described extend over the entire table of FIG. 10 and exhibit a regular data stream structure, repeated after every five data words TmpA–TmpE. This structure can be used to enable simple monitoring of the synchronization state of the transmission. Only when the synchronization state has a negative outcome does the data stream have to be resynchronized using the method described in FIG. 9.

Figures 11A, 11B, 11C:
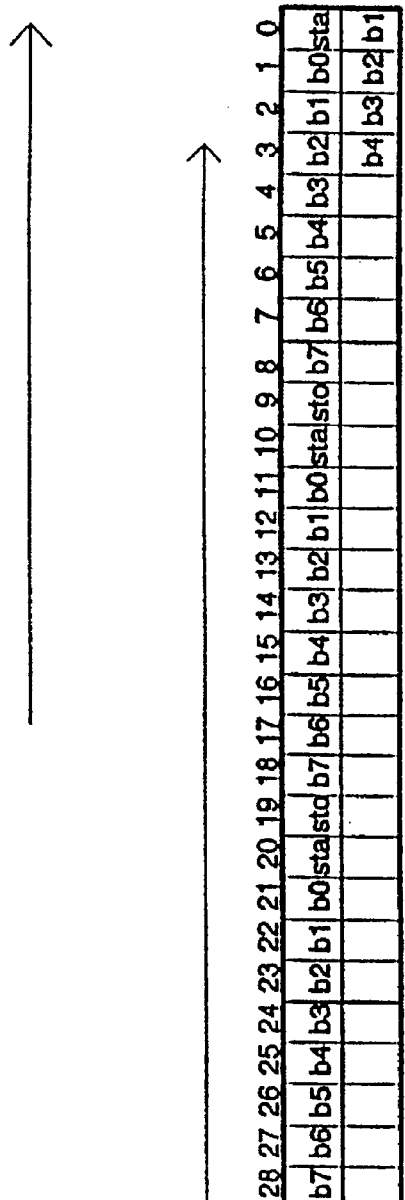
FIGS. 11A–11C show a data unit in various phases of a processing cycle in the preparation for data extraction.

FIGS. 11A–11C show a data unit DE with two data words TmpA and TmpB. The starting position for three successive processing steps, proceeding in the same cycle, is shown in FIG. 11A. It can be seen there that the data contents for the data words TmpA and TmpB are the same as in the table in FIG. 10 for cycle Tkt0. All the control data, except for the start and stop bits "sta" and "sto" are now removed from the two data words TmpA and TmpB. The data remaining in the data word TmpA are shifted flush left in the direction represented by an arrow above the data word TmpA (FIG. 11B), while the other data remaining in the data word TmpB are shifted flush right in the direction represented by an arrow below the data word TmpB (FIG. 11B). The results of the described operations can be seen from FIG. 11B. This is also the starting position for the microprocessors that are currently available for the arithmetic and logic units RE1–RE3 and their special functions for shifting a coherent double word to the right or left. The contents of the data unit DE of FIG. 11B can thus be shifted coherently far enough to the right that the data in their new form are again flush right both in the data word TmpA and in the data word TmpB. The direction of the shift is represented by the arrow above the data word TmpA in FIG. 11C.

Instead of using microprocessors in the above method steps to exploit the special functions, the shifting of the data words TmpA and TmpB can also be individually done. However, the disadvantage is that the method takes longer and is more complicated.

Figures 12A, 12B, 12C:
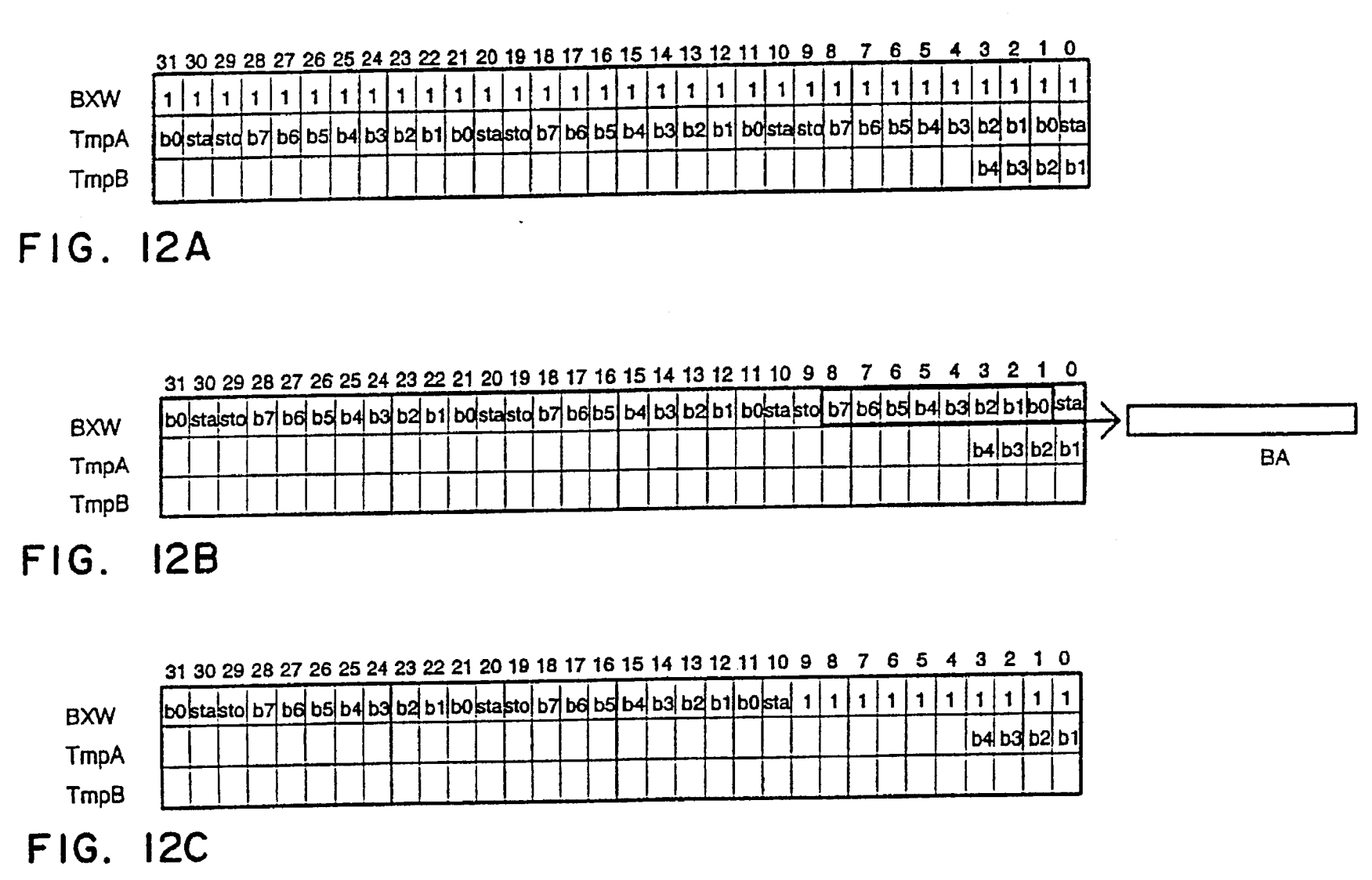

FIGS. 12A–12F show the further method phases, which still proceed in the same cycle Tkt0; these can be termed the actual extraction phases. The useful data B0–B7 are extracted from the prepared data stream and sent for further processing or interpretation to the central computer ZR (see FIG. 3) or to the computer R (FIGS. 1, 2 and 4). To illustrate this process, an additional extraction word BXW has been shown above the data unit DE. At the beginning of the process, the extraction word BXW is completely filled with 1's, as shown in FIG. 12A. By performing a right-shift operation described above, the contents of the data words TmpA and TmpB are shifted to flush right the extraction word BXW (FIG. 12B). From the extraction word BXW, the useful data b0–b7—outlined in black in FIG. 12B—are reached out and carried onward via register BA. The bit positions read in the extraction word BXW, along with the corresponding start and stop bits "sta" and "sto", are rewritten with "1"s (see FIG. 12C). If there are any other relevant data in the data word TmpA, then they are shifted far enough into the extraction word BXW that the data word TmpA no longer contains any relevant data and the data is flushed left in the extraction word BXW (FIG. 12D). Now, in this cycle Tkt0, one byte of useful data b0–b7 is read a final time (FIG. 12E) and again replaced with 1's in the extraction word BXW (FIG. 12F). This concludes the processing of the instantaneous data unit DE, and reallocation of the data word name can be done in the next cycle, as described in conjunction with FIG. 10.

As mentioned above, the bit rate adaptation takes place in both directions simultaneously. The method described in conjunction with FIGS. 6–12 can be employed in the other direction as well, namely from the data rate DR to the network rate NR. The corresponding method steps need merely be employed in the opposite order, with the simplification that the synchronization steps described in conjunction with FIG. 9 are not necessary.

The data of the data stream DAS (FIG. 6) that are to be processed in the data sets DS0 and DS1 (FIG. 7) of the local memories of the arithmetic and logic units RE1–RE3 (FIG. 3) can also be stored in a buffer memory, embodied for instance as a FIFO (first-in–first-out) memory and transferred to the local memories of the arithmetic and logic units RE1–RE3 (FIG. 3) only in a second step. If the data are buffer stores, then processing the data sets DS0 and DS1 (FIG. 7) in alternation, as described above, is not necessary. In particular, the two data sets DS0 and DS1 can be processed with one another. For performing the functions of the coupling units K1–K6 (FIG. 3), a Siemens HSCX component, or some other suitable component, may be used; the HSCX component has an integrated buffer store embodied as a FIFO memory. Finally, the buffer memory also makes it possible to reduce the number of data sets DS0 and DS1 (FIG. 7) to a single data set DSO or DS1.

In the present embodiment, for all the variables and memory units, the word length WL has been given as 32 bits. The method steps illustrated can also be adapted to an arbitrarily selected word length WL.

The invention is understood not to be limited to being used under currently prevailing ISDN standards; instead, they can also be used if ISDN performance characteristics change, or in other networks, if the task remains the same.

I claim:

1. A method for performing a bit rate adaptation of a data stream in a data channel that exchanges information, including at least one of user and control information, between at least two units operating at different transmission rates, each of the at least two units including a receiver unit, said method comprising the steps of:

dividing the data stream into at least one data set that is specified by a word length of an arithmetic and logic unit for processing the data stream of the data channel;

extracting the user information from the at least one data set; and transferring the extracted user information between the receiver units.

2. The method of claim 1, comprising performing the bit rate adaptation in accordance with CCITT recommendation V.110.

3. The method of claim 1, wherein the transferring step comprises bidirectionally transmitting the information in one of a transmission direction and a reception direction, and the bit rate adaptation being performed in at least one stage.

4. The method of claim 1, further comprising eliminating non-relevant data in the data stream.

5. The method of claim 1, the bit rate adaptation comprising a plurality of stages, in which a last stage of the plurality of stages contains at least one of the at least one data set.

6. The method of claim 5, wherein when the last stage contains at least two data sets in succession, positioning the information such that a number of words in one of the at least two data sets corresponds to a number of bytes in the specified word length of the arithmetic and logic unit, shifting the words in the one of the at least two data sets relative to one another, and combining the shifted words into a single word.

7. The method of claim 1, further comprising checking a synchronization stage during the course of performing the bit rate adaptation, the synchronization stage being positioned between the data stream and the arithmetic and logic unit.

8. The method of claim 1, further comprising the step of at least partially eliminating control data from the data stream.

9. The method of claim 1, comprising storing the contents of the at least one data set, the stored contents being transferred to one of a computer or a data network.

10. The method of claim 1, comprising performing the bit rate adaptation in cycles, in which at least one data set is processed per cycle.

11. The method of claim 1, comprising processing a plurality of data channels having corresponding data streams, the plurality of data channels being processed by one arithmetic and logic unit.

12. The method according to claim 1, further comprising periodically repeating synchronization bit patterns provided in the control information for synchronization and for recognition of a beginning of the user information in the data steam, and providing at least one search window for synchronization of the arithmetic and logic unit with the data stream.

13. A method for performing a bit rate adaptation of a data stream in a data channel that exchanges information over a digital telecommunications network between a computer and a data transmitting/receiving device operating at different transmission rates, comprising the steps of:

dividing the data stream into at least one data set that is specified by a word length of an arithmetic and logic unit;

extracting the information from the data set; and transferring the extracted information between the computer and the data transmitting/receiving device.

\* \* \* \* \*